US009199426B2

(12) United States Patent
de Koning et al.

(10) Patent No.: US 9,199,426 B2
(45) Date of Patent: Dec. 1, 2015

(54) TIER CAP FORMING APPARATUS

(75) Inventors: Johannes J.M. de Koning, Glen Allen, VA (US); Geoffrey J. Parnell, Moseley, VA (US); Stephen V. Turner, Mechanicsville, VA (US)

(73) Assignee: Flexicell Inc., Ashland, VA (US)

( * ) Notice: Subject to any disclaimer, the term of this patent is extended or adjusted under 35 U.S.C. 154(b) by 1086 days.

(21) Appl. No.: 13/192,076

(22) Filed: Jul. 27, 2011

(65) Prior Publication Data

US 2013/0029824 A1 Jan. 31, 2013

(51) Int. Cl.
*B65G 57/00* (2006.01)
*B31B 3/00* (2006.01)
*B31D 1/00* (2006.01)

(52) U.S. Cl.
CPC ......... *B31D 1/005* (2013.01); *B31B 2201/0241* (2013.01); *B31B 2201/0282* (2013.01); *B31B 2201/26* (2013.01)

(58) Field of Classification Search
CPC ................................. B65G 57/00; B31B 3/00
USPC ........... 414/796.5, 797, 789.5, 791.6; 493/59, 493/68, 70, 79, 80, 418, 397, 964; 53/157, 53/445, 399, 441, 556, 587, 588, 447, 540, 53/580, 397
See application file for complete search history.

(56) References Cited

U.S. PATENT DOCUMENTS

| | | | | |
|---|---|---|---|---|
| 4,400,929 A | | 8/1983 | Iwaki et al. | |
| 4,955,177 A | | 9/1990 | Lerner et al. | |
| 4,978,275 A | * | 12/1990 | Reid et al. | 414/789.5 |
| 5,336,042 A | * | 8/1994 | Winski et al. | 414/789.5 |
| 2008/0122160 A1 | | 5/2008 | Ouellette et al. | |

* cited by examiner

*Primary Examiner* — Andrew M Tecco
*Assistant Examiner* — Praachi M Pathak
(74) *Attorney, Agent, or Firm* — Laubscher, Spendlove & Laubscher, P.C.

(57) ABSTRACT

A pallet tier cap forming apparatus is provided for forming a horizontal planar paperboard blank into a pallet tier cap. The blank includes a generally rectangular center panel having four edges, and four flaps connected by fold lines with the center panel edges, respectively. A blank transport device initially displaces the blank laterally in a first diagonal direction for simultaneous engagement with a first orthogonally arranged pair of drag walls, and vertically upwardly, thereby to break downwardly about associated fold lines a first pair of adjacent flaps of the blank. The blank is further displaced laterally in the first direction, thereby to reversely fold back the first pair of flaps about the associated wall junctions toward an acute angle relative to the blank center panel. The blank is then displaced in the opposite diagonal direction, and the forming steps are repeated to fold downwardly simultaneously a second pair of flaps.

9 Claims, 5 Drawing Sheets

FIG. 4c
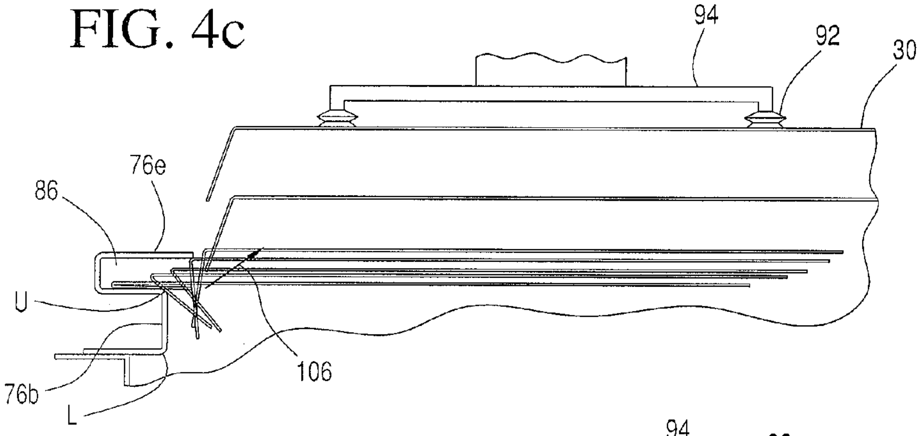
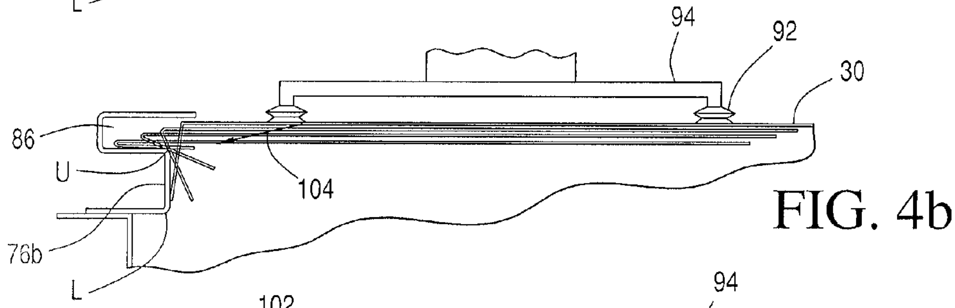
FIG. 4b
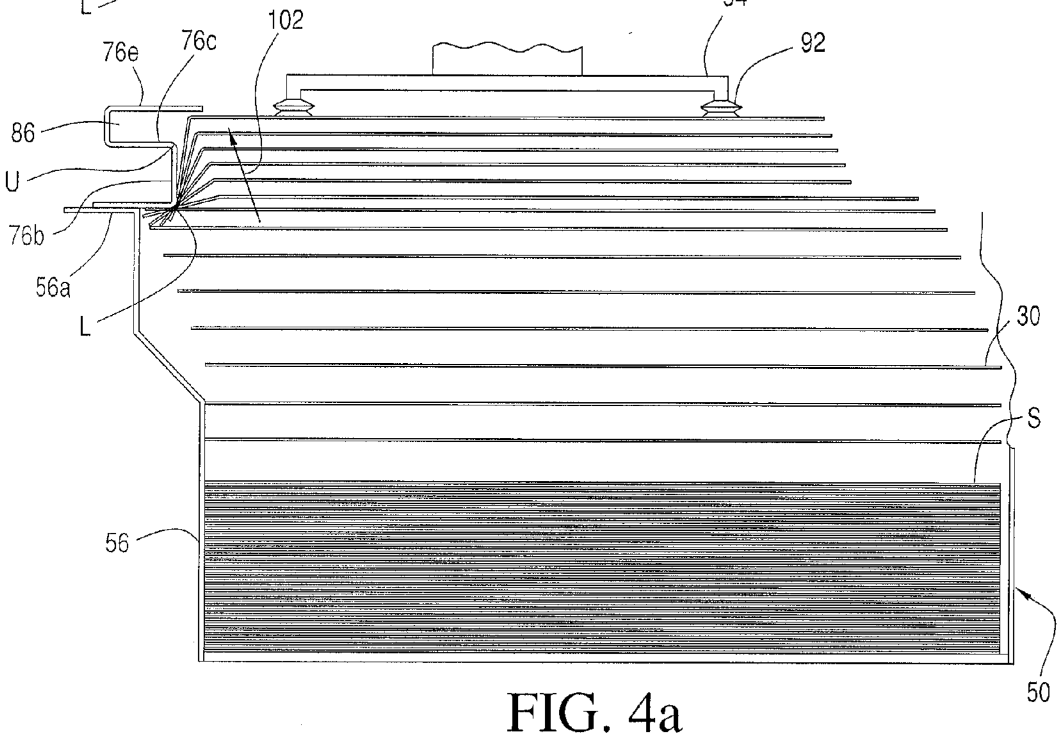
FIG. 4a

TIER CAP FORMING APPARATUS

BACKGROUND OF THE INVENTION

1. Field of the Invention

Pallet tier cap forming apparatus for forming into a pallet tier cap a horizontal planar paperboard blank including a generally rectangular center panel having four edges, and four flaps connected by fold lines with said center panel edges, respectively. A blank transport device initially displaces the blank laterally in a first diagonal direction to break simultaneously downwardly a first pair of flaps. The blank is then displaced laterally in the opposite diagonal direction, and the forming steps are repeated to fold downwardly simultaneously a second pair of flaps.

2. Brief Description of the Prior Art

Tier sheets are used between layers of palletized products to distribute the load and prevent cases from an upper layer from concentrating their force and crushing cases on a lower layer. Examples of apparatus and methods for forming and handling such pallet tier sheets are shown by the patents to Winski et al U.S. Pat. No. 5,336,042, Lerner et al U.S. Pat. No. 4,955,177, and Iwaki et al U.S. Pat. No. 4,400,929, and the Ouellette et al patent application publication No. US 2008/0122160.

Often cases do not have lids as a lid is redundant product protection if a tier sheet covers the layer. When lidless cases are palletized a tier cap sheet is often used to stiffen the edges of a tier sheet and prevent upper layer cases from bending the edge of a tier sheet down into a lower level case. A cap tier sheet must have its flaps broken down or up and those flaps must remain broken less than 180 degrees to provide rigidity to the edge of the tier sheet. For an automated palletizing machine, the flaps must be automatically bent.

One method for bending the flaps is to hold a single tier cap from the top in a suspended position, actuate a plate to hold the tier cap up just inside the intended break line, then actuate a plate to come down and break the flap downwardly. This operation is repeated on all four sides to the tier cap until all four flaps are bent down and enough memory remains that they do not spring back to 180 degrees. This method and apparatus is time consuming and requires expensive actuators. The resulting bend angles from this method and apparatus are marginal as the bending action does not initially force the bend to less than approximately 60 degrees and when the flap bends back out it often goes back to almost 180 degrees. The time this method and apparatus takes is often unacceptable for an automated palletizing cell. Palletizing cells are typically designed to keep up with case production plus a safe margin to ensure the palletizing cell is not the bottleneck in the production line. The additional time for bending four flaps on a tier cap at every layer slows the overall processing time down considerably.

Therefore, the prior art machines have the drawbacks that a tier cap sheet on an automated palletizing cell can be very expensive to implement, provide inadequate bending of the flaps, and may take too much time to allow for full automation.

SUMMARY OF THE INVENTION

Accordingly, a primary object of the present invention is to provide apparatus for forming into a pallet tier cap a horizontal planar paperboard blank including a generally rectangular center panel having four edges, and four flaps connected by fold lines with said center panel edges, respectively, use being made of a blank transport device that initially displaces the blank laterally in a first diagonal direction to break simultaneously downwardly a first pair of flaps. The blank is then displaced laterally in the opposite diagonal direction, and the forming steps are repeated to fold downwardly simultaneously a second pair of flaps.

According to a more specific object of the invention, a magazine containing an open-topped chamber is provided for receiving a vertical stack of the blanks, and a trip ledge arrangement is arranged concentrically above said chamber, including a rectangular arrangement of a plurality of planar orthogonally-arranged vertical drag walls having coplanar horizontal upper edges, and a plurality of coplanar horizontal fold walls extending outwardly from said drag wall upper edges, respectively, said drag walls and said fold walls cooperating to define a plurality of right-angled junctions, respectively. The blank transport device successively vertically elevates the uppermost one of said blanks from the stack toward a position within the space defined between said drag walls, initially displaces said one blank simultaneously laterally in a first diagonal direction for simultaneous engagement with a first orthogonally arranged pair of said drag walls, and vertically upwardly toward a position in which the blank center panel is at a slightly higher elevation than that of said horizontal fold walls, thereby to break downwardly about the associated fold lines a first pair of adjacent flaps of said one blank. The blank is subsequently displaced laterally further in said first diagonal direction, thereby to reversely fold back said first pair of flaps about the associated junctions toward an acute angle relative to the blank center panel. The blank is then displace diagonally in the opposite direction, and the steps are repeated to simultaneously fold downwardly a second pair of flaps by a second pair of orthogonally arranged drag walls and the associated fold walls.

According to one embodiment of the invention, the magazine side walls have coplanar horizontal upper edges, and the trip ledge arrangement includes a plurality of linear trip ledge members parallel with, and connected with the upper edges of, said magazine side walls, respectively, each of said trip ledge members including a vertical first wall defining said drag wall, and a horizontal second wall connected with the upper edge of said vertical wall defining said fold wall. Preferably, the trip ledge members are adjustably connected for lateral horizontal adjustment relative to the associated side wall of the magazine.

According to a second embodiment, the drag walls are integral with said magazine side walls, respectively.

According to a further object, a horizontal guide wall is provide in spaced relation above each of the horizontal fold walls, thereby to define a slot for receiving the corresponding folded tab portion of the blank. Preferably, the height of the guide wall may be adjusted relative to the associated fold wall.

Basically, the present apparatus of the present invention uses the controlled motions of a lifting device to exert forces to the tier cap sheet against a flap folding apparatus. The apparatus is mounted above a magazine which is filled a stack of unbroken tier cap sheets. The lifting device enters the magazine and attaches to the top tier cap with vacuum cups mounted on the bottom of the lifting device end of arm tool. The lifting device lifts the top tier cap several inches to allow the top tier cap to separate from the tier cap sheets below the top one. The lifting device then moves upwardly and diagonally towards one corner of the flap folding apparatus. As the tier cap moves upwards towards the corner, the flaps encounter resistance on two adjacent sides closest to the target corner. The resistance, coupled with the lift from the end of arm tool, cause the flaps on the two adjacent sides to break downwardly as the lifting device continues to lift. The lifting device continues this trajectory until the broken edges of the tier cap are above the folding edge of the bending apparatus. The lifting device then moves the cap tier in a horizontal plane diagonally directed towards the corner. As the tier cap is forced over the corner, the flaps continue to bend to a smaller angle. The apparatus may have a top guide which forces the top edge of the tier cap downward to further decrease the angle of the bend and prevent the tier cap from lifting up due to the increasing energy in the bent flaps which are being forced to a smaller angle. The final motion of the lifting device for a bend is to press straight down and bend the flap all the way to 0 degrees. The lifting device then traverses horizontally towards the opposite corner. Once the bent corner of the tier cap is no longer restrained by the bending apparatus, the lifting device moves the tier cap down and towards a point at the opposite corner from the first bending operation took place. Once at that point, the lifting device moves the tier cap in the same motions as described for the first two flaps in order to fold the remaining two flaps with the other bending apparatus.

Tier sheets tend to bow on their edges when they are lifted, unless a flap is bent to eliminate the likelihood of bending, in which event the edge of the tier sheet at the break becomes very straight. A lightweight tier sheet may bow so much that the force to bend the flap is not enough to overcome the force the bow produces for preventing the tier sheet to break at the score line. This situation often occurs when one flap is bent at a time. Two adjacent sides of a tier sheet cannot both bow. Once one side bows, the other side will stay straight and bent down, and cannot bow. As such, if two adjacent sides are simultaneously bent with the apparatus described above, the side which bows will be bent at the break line which will lift the other side and reduce the bow enough to bend it at the break line. Simultaneous bending operations taking place on two adjacent sides is often necessary to properly break a light weight tier sheet which bends as it is lifted.

Once the bending operation has been completed on the two corners and the four flaps are bent, the lifting device precedes to placing the tier cap sheet on the layer of boxes.

BRIEF DESCRIPTION OF THE FIGURES

Other objects and advantages of the invention will become apparent from a study of the following specification, when viewed in the light of the accompanying drawing, in which:

FIGS. 4*a*-4*c* are detailed sectional views illustrating the steps for forming a pallet tier cap using the apparatus of FIG. 3;

DETAILED DESCRIPTION

Figure 1A:
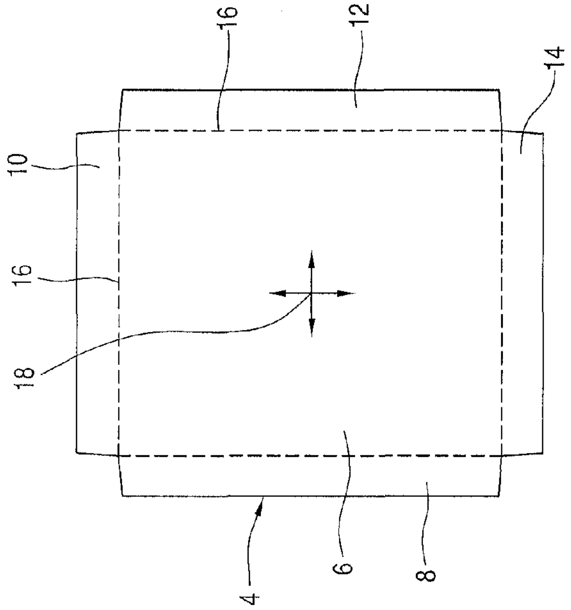
FIG. 1a PRIOR ART
FIGS. 1*a* and 1*b* are top and side elevation views, respectively, of a pallet tier blank of the prior art in the initial flat, unfolded condition.
Figure 1B:
FIG. 1b PRIOR ART
Figure 1C:
FIG. 1c PRIOR ART
FIG. 1*c* is a side elevation view of the blank of FIG. 1*a* in the folded condition.

Referring first more particularly to FIGS. 1*a*-1*c*, it is known in the prior art to form a pallet tier cap 2 from a rectangular or square blank 4 that is cut or punched from a paperboard material, such as a single layer fibrous sheet, three-layer corrugated cardboard stock, or the like. The blank has a center panel 6, and flaps 8, 10, 12 and 14 connected with the center panel by fold, crease or score lines 16. In a conventional four-step process diagrammatically shown by the arrows 18, the center panel was laterally displaced in four orthogonally arranged directions to successively bend the four flaps downwardly relative to the center panel toward the inclined final positions shown in FIG. 1*c*.

Figure 2A:
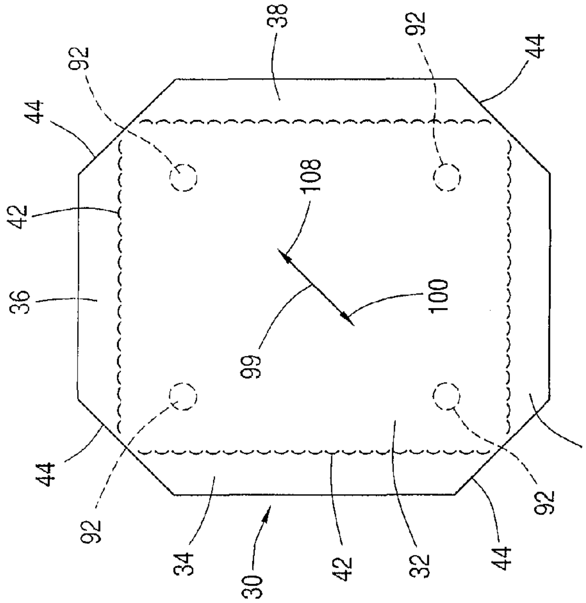
FIGS. 2*a* and 2*b* are top and side elevation views, respectively, of a pallet tier blank of the present invention in the initial unfolded condition.
Figure 2B:
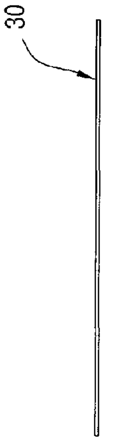
Figure 2C:
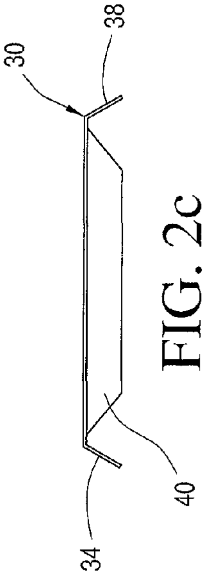
FIG. 2*c* is a side elevation view of the blank of FIG. 2*a* in the folded condition.

Referring now to FIGS. 2*a*-2*c*, according to the present invention, a rectangular blank 30 of single layer or multi-layer paperboard material is provided having a center panel 32, and flaps 34, 36, 38, and 40 connected with the center panel by fold lines 42. In order to obtain the desired memory characteristic, the fold lines 42 are preferably scallop-cut lines that extend partially through the material. Preferably the four corners of the blank are angularly cut by lines of severance 44, whereby the flaps have a generally trapezoid configuration.

Figure 3:
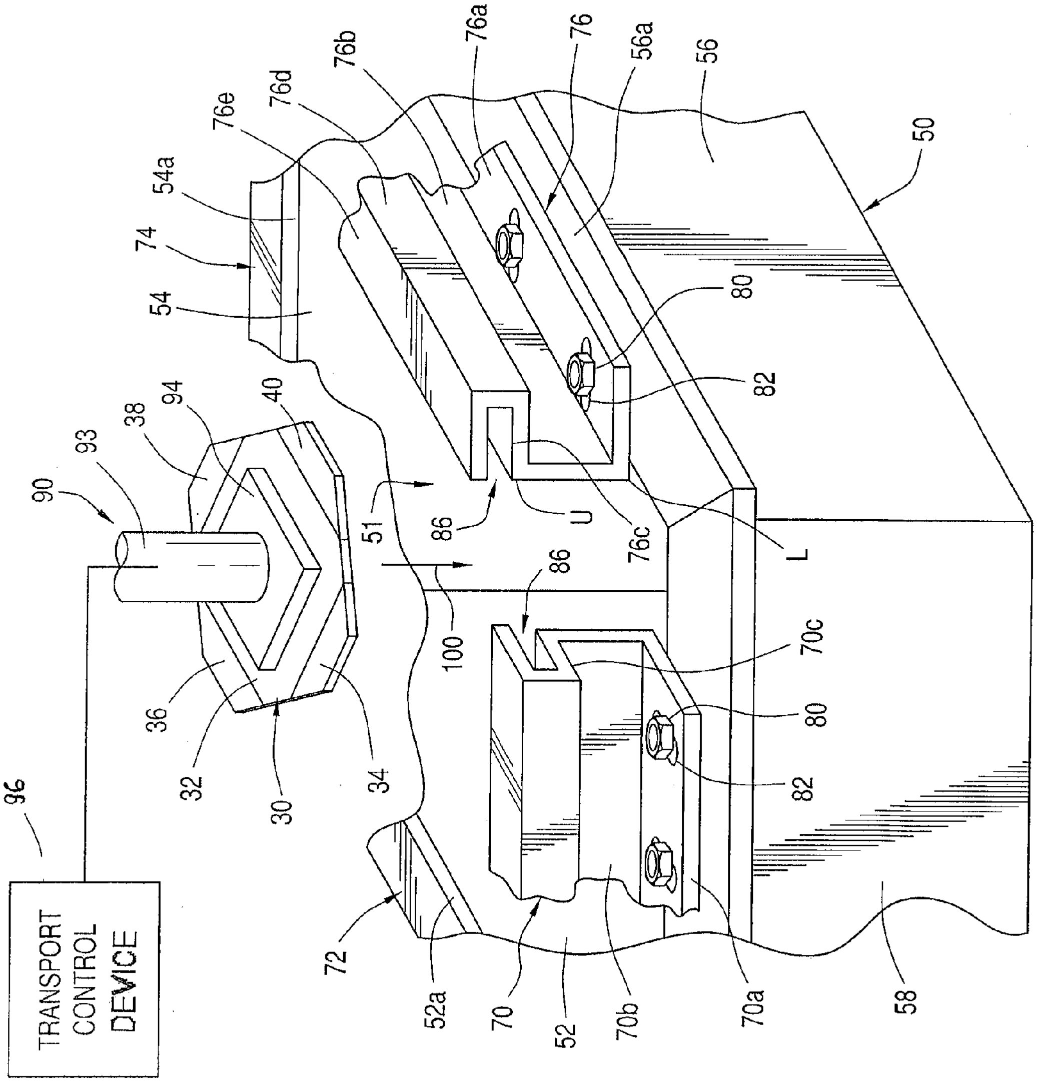
FIG. 3 is a detailed perspective view illustrating a first embodiment of the invention including trip ledge members arranged in a rectangular pattern above the blank magazine.

As shown in FIG. 3, an open-topped magazine 50 is provided containing a rectangular chamber 51 for receiving a vertical stack of the unfolded horizontal blanks 30 of FIGS. 2*a* and 2*b*. The magazine has a bottom wall, and two opposed pairs of side walls 52, 54, 56, and 58 that terminate at their upper edges in horizontal support flanges 52*a*, 54*a*, 56*a*, and 58*a*. Four orthogonally-arranged linear trip ledge members 70, 72, 74 and 76 are adjustably mounted on the support flanges by bolts 80 that extend into the support flanges via slots 82 contained in the lower horizontal flange portions of the trip ledge members. Consequently, the trip ledge members may be adjusted laterally toward or away from the opening above chamber 51. For purposes of illustration, only the front two trip ledge members 70 and 76 have been shown in detail in FIG. 3. The trip ledge member 76 includes a horizontal lower flange portion 76*a*, a vertical drag wall portion 76*b*, a horizontal fold wall portion 76*c*, a vertical spacer wall portion 76*d*, and a horizontal guide wall portion 76*e* that is parallel with, and is spaced above, the horizontal fold wall portion 76*c*, thereby to define a slot 86 facing the central space above the magazine 50. The connection between the flange wall portion 76*a* and the vertical drag wall 76*b* defines a lower right-angled junction L, and the connection between drag wall portion 76*b* and the horizontal fold wall portion 76*c* an upper right-angled junction U. The other trip ledge members have corresponding configurations and elements.

A robotic vacuum-type blank transport mechanism 90 is provided for lifting the uppermost blank 30 from the stack, and for displacing the blank during the flap folding steps. The transport mechanism includes four suction cups 92 (shown schematically in FIG. 4*a*) that are connected with the vacuum source 93 and engage the upper surface of the blanks for temporarily attracting the blanks to the transport body 94. As will be explained below, the displacement of the transport body 94 is controlled by a conventional programmable robotic transport control device 96, thereby to bend downwardly the flaps to the final positions shown in FIG. 2*c*.

In operation, as shown diagrammatically by FIGS. 4*a*-4*c*, the upper blank 30 of the stack S is removed by the vacuum suction cups 92 of the robotic blank transport device 94, and is transported diagonally (arrow 99 in FIG. 2*a*) in a first direction (shown by the arrow head 100 in FIGS. 2*a* and 3), and upwardly and laterally outwardly toward a position in which the edges of a pair of adjacent flaps 34 and 40 are positioned beneath the lower junctions L of a first pair of trip ledge members 70 and 76. As the blank 30 is moved upwardly against the lower junction L, the flaps 34 and 40 are simultaneously broken downwardly about the associated scallop-cut fold lines (FIG. 4*a*), and are dragged upwardly along the adjacent faces of the two orthogonally-arranged drag walls 70*b* and 76*b* (as shown by the arrow 102 in FIG. 4*a*). Since two orthogonally arranged flaps are being bent down simultaneously, bowing of the blank is avoided. When the blank is elevated to a position above the upper junction U (FIG. 4*b*), the blank is displaced by the transport mechanism 90 further in the first diagonal direction 100 laterally outwardly into the slots 86, and downwardly against the fold walls 70*c* and 76*c*, as shown by the arrow 104 in FIG. 4*b*. The flaps 38 and 40 are thus folded through 180° toward positions in engagement against the under surface of the blank center panel 32.

The blank is then transported diagonally in the opposite direction (as shown by the arrowhead 108 in FIG. 2*a*), downwardly into the magazine chamber toward an elevation below the trip ledge members 72 and 74, whereupon the process is repeated to bend downwardly the remaining pair of adjacent flaps 36 and 38. The folded blank (now having the configuration of FIG. 2*c*, with the fold memory established by the scallop-cut fold line) is then transported by the blank transport outwardly away from the magazine 50.

Figure 5C:
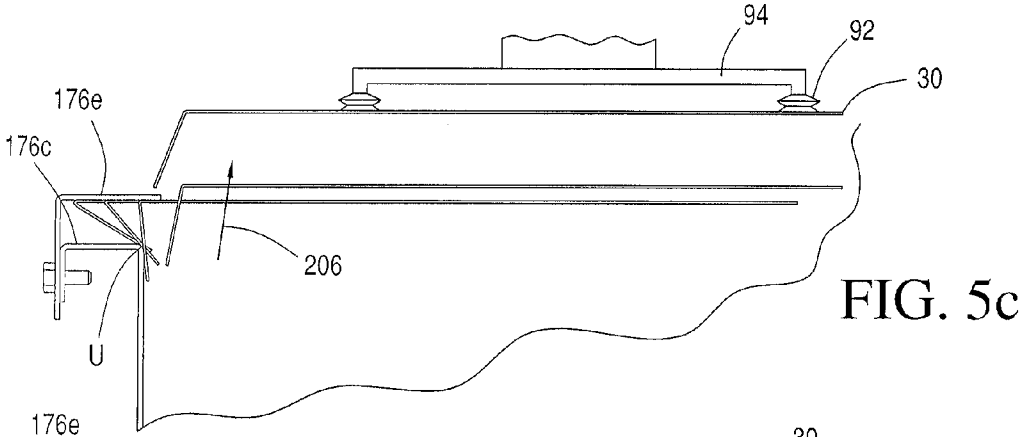
FIGS. 5*a*-5*c* are detailed sectional views illustrating the steps for forming a pallet tier blank by the use of a second embodiment of the invention.
Figure 5B:
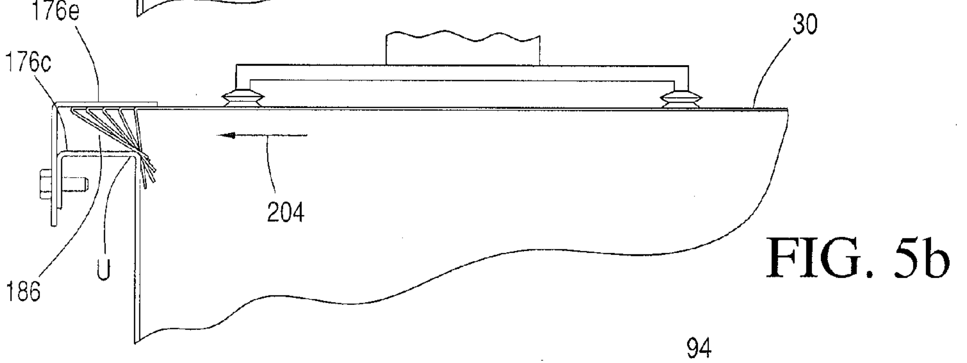
Figure 5A:
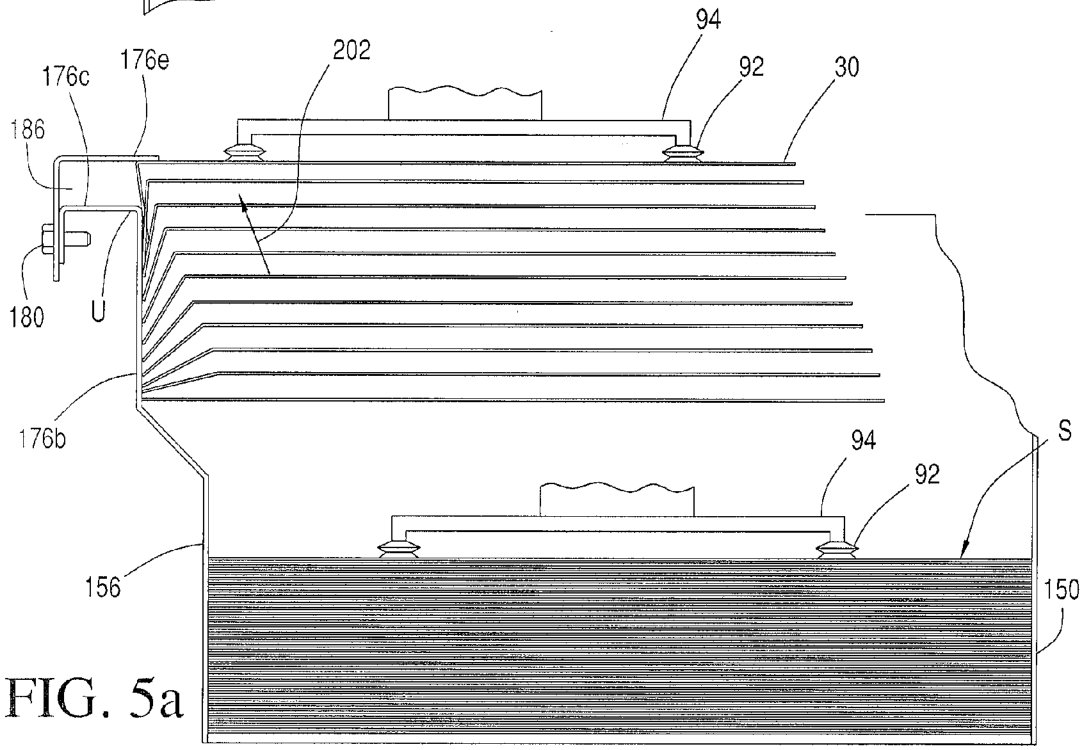

In the second embodiment shown in FIGS. 5*a*-5*c*, the blank 30 is laterally displaced diagonally in a first direction for simultaneous engagement with a first pair of orthogonally-arranged drag walls that are integral with the vertical side walls of the magazine 150, and upwardly as shown by the arrow 202. A first pair of flaps 34 and 40 are simultaneously folded downwardly about the corresponding fold lines, and the blank is elevated toward a position in which the blank center panel engages the under surfaces of the horizontal guide walls. The blank 30 is further displaced diagonally in the first direction, whereupon the folded edges are introduced into a pair of slots 186, with the blank center panel in engagement with the lower surfaces of the guide walls, and with the lower portions of the flaps in engagement with the upper junctions U. The blank is then displaced diagonally in the opposite direction out of the two slots 186, and the forming steps are repeated by using the other pair of drag walls to bend down the remaining pair of adjacent flaps 36 and 38. Owing to the provision of bolt and vertical slot adjusting devices 180, the vertical spacing distance between the horizontal fold and guide walls, and consequently, the height of the slots 186, may be adjusted as desired.

Figure 6C:
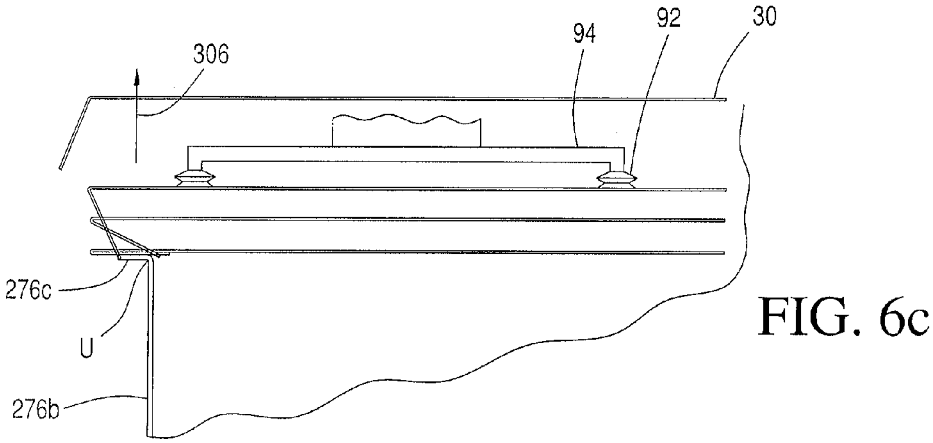
FIGS. 6*a*-6*c* are detailed sectional views illustrating the steps for forming a pallet tier blank by the use of a third embodiment of the invention.
Figure 6B:
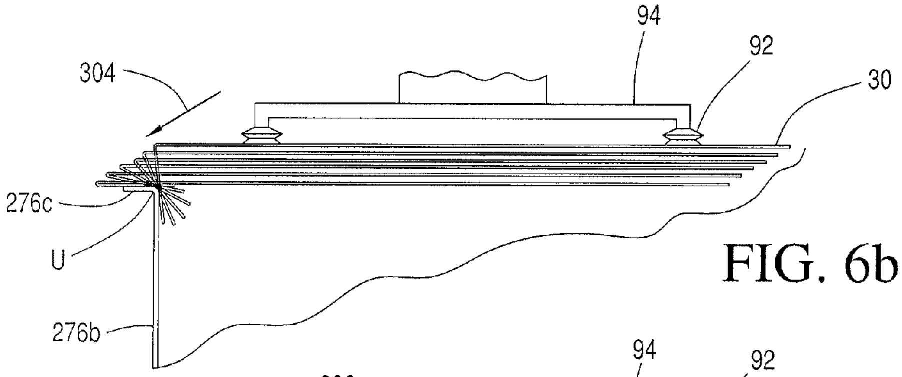
Figure 6A:
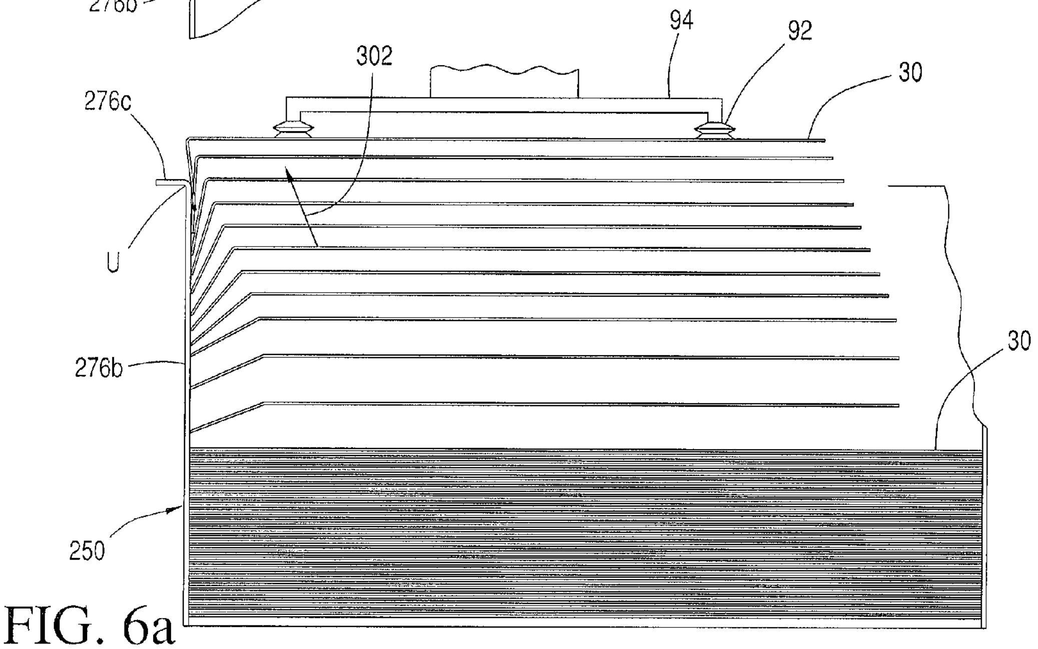

According to a third embodiment shown in FIGS. 6*a*-6*c*, the four orthogonally arranged drag walls are integral with the magazine side walls, and upper junctions U are formed between the upper edges of the vertical drag walls and the associated horizontal fold walls. In this case, the blank 30 is simply diagonally displaced in a first direction for simultaneous engagement with a pair of orthogonally arranged drag walls, and upwardly as shown by the arrow 302 to drag the flaps along the faces of the associated two drag walls, and to simultaneously bend downwardly these two flaps. The blank is further displaced in the first diagonal direction to bend the flaps about the upper junction U, whereupon the blank is pressed against the horizontal fold walls as shown by the arrow 304, whereupon the two flaps 34 and 40 are simultaneously bent back 180° against the lower surface of the blank center panel. The blank is then displaced diagonally in the opposite direction, and the forming process is repeated to bend downwardly the second pair of flaps 36 and 38.

While the preferred forms and embodiments of the invention have been illustrated and described, it will be apparent to those skilled in the art that changes may be made without deviating from the invention described above.

What is claimed is:

1. Apparatus for forming a horizontal planar paperboard blank into a pallet tier cap, the blank including a rectangular center panel having four edges and four flaps connected with the center panel edges by fold lines, respectively, comprising:

(a) a magazine including a bottom wall, and two pairs of opposed parallel vertical side walls cooperating with said bottom wall to define a rectangular open-topped chamber for receiving a vertical stack of the blanks;

(b) a trip ledge assembly connected with said upper edges of said magazine side walls and including:

(1) a rectangular assembly of a plurality of planar vertical drag walls having coplanar horizontal upper edges;

(2) a plurality of coplanar horizontal fold walls extending outwardly from said drag wall upper edges, respectively, to define an outer perimeter for said trip ledge assembly which extends beyond said drag wall upper edges and an outer perimeter of the blank, said drag walls and said fold walls cooperating to define a plurality of right-angled junctions, respectively; and (c) a blank transport mechanism for successively displacing individual planks diagonally and vertically relative to said trip ledge assembly to successively fold pairs of flaps toward an acute angle relative to the blank center panel.

2. Apparatus as defined in claim 1, wherein said magazine has a square horizontal cross-sectional configuration.

3. Apparatus as defined in claim 1, wherein said drag walls are integral with said magazine side walls, respectively.

4. Apparatus as defined in claim 1, wherein said magazine side walls have coplanar horizontal upper edges; and further wherein said trip ledge arrangement includes a plurality of linear trip ledge members parallel with, and connected with the upper edges of, said magazine side walls, respectively, each of said trip ledge members including a vertical first wall defining said drag wall, and a horizontal second wall connected with the upper edge of said vertical first wall defining said fold wall.

5. Apparatus as defined in claim 4, and further including a horizontal adjustment assembly for horizontally adjusting the positions of said trip ledge members relative to the associated magazine side walls, respectively.

6. Apparatus as defined in claim 1, and further including a plurality of horizontal guide walls mounted in spaced relation above said fold walls to define slots for receiving the folded tab portions of said one blank.

7. Apparatus as defined in claim 5, and further including a vertical adjustment assembly for adjusting the vertical position of each of said guide walls relative to the associated fold walls, respectively.

8. Apparatus as defined in claim 6, wherein said blank center panel engages the lower surface of said guide walls when said blank is subsequently displaced further in either diagonal direction.

9. A method for forming a horizontal planar paperboard blank into a pallet tier cap, the blank including a rectangular center panel having four edges and four flaps connected with the center panel edges by fold lines, respectively, comprising the steps of (a) positioning a blank in a magazine including two pairs of opposed parallel vertical side walls to define a rectangular open-topped chamber;

(b) displacing the blank relative to a trip ledge arranged concentrically above the chamber and including vertical drag walls arranged in a rectangle and horizontal fold walls extending outwardly from the fold walls, respectively, to define a plurality of right-angled junctions, said displacing step including initially displacing the blank laterally in a first diagonal direction for simultaneous engagement with a first orthogonally arranged pair of the drag walls and vertically upwardly toward a position in which the blank center panel is at a slightly higher elevation than that of the horizontal fold walls, thereby to break downwardly about the associated fold lines a first pair of adjacent flaps of the blank;

subsequently displacing the blank laterally further in said first diagonal direction, thereby to reversely fold back the first pair of flaps about the associated junctions toward an acute angle relative to the blank center panel;

displacing the blank laterally in a second direction opposite said first diagonal direction;

lowering the blank to a position adjacent the lower edges of the drag walls;

initially displacing the blank laterally in said second diagonal direction for simultaneous engagement with a second pair of the orthogonally-arranged vertical drag walls, and vertically upwardly toward a position in which the elevation of the blank center panel is higher than that of the horizontal fold walls, thereby to break downwardly about the associated fold lines a second pair of adjacent flaps of the blank; and subsequently displacing the blank further in said second diagonal direction, thereby to reversely fold back said second pair of flaps about the associated junctions toward an acute angle relative to the blank center panel.

* * * * *